(12) United States Patent
McPherson et al.

(10) Patent No.: US 10,169,209 B2
(45) Date of Patent: Jan. 1, 2019

(54) CONTAINER IMAGES BY COMPOSITION

(71) Applicant: Red Hat, Inc., Raleigh, NC (US)

(72) Inventors: Daniel McPherson, Raleigh, NC (US); Stephen Tweedie, Edinburgh (GB); Benjamin Parees, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 140 days.

(21) Appl. No.: 15/344,016

(22) Filed: Nov. 4, 2016

(65) Prior Publication Data

US 2018/0129479 A1 May 10, 2018

(51) Int. Cl.
*G06F 9/44* (2018.01)
*G06F 11/36* (2006.01)
*G06F 8/61* (2018.01)
*G06F 9/455* (2018.01)

(52) U.S. Cl.
CPC ............ *G06F 11/3668* (2013.01); *G06F 8/63* (2013.01); *G06F 9/45558* (2013.01)

(58) Field of Classification Search
CPC ........................................................ G06F 8/60
See application file for complete search history.

(56) References Cited

U.S. PATENT DOCUMENTS

2016/0381075 A1* 12/2016 Goyal ..................... H04L 63/20 713/176
2017/0116415 A1* 4/2017 Stopel .................. G06F 21/554
2018/0075152 A1* 3/2018 Zhang ............... G06F 17/30873
2018/0088926 A1* 3/2018 Abrams ..................... G06F 8/65
2018/0095973 A1* 4/2018 Huang .............. G06F 17/30156

OTHER PUBLICATIONS

Brown ("Explaining Docker Image IDs", Jun. 8, 2016) (Year: 2016).*
Docker, Understanding Docker, 2015 (5 pages).
Tittel et al., Unidesk VDI image management delivers, 2013 (5 pages).
VMware, VMware Mirage, 2015 (3 pages).

* cited by examiner

*Primary Examiner* — Li B. Zhen
*Assistant Examiner* — Lenin Paulino
(74) *Attorney, Agent, or Firm* — K&L Gates LLP

(57) ABSTRACT

Methods and systems for creating containers by composition are disclosed. For example, a container image includes multiple layers, including first and second layers, which an image engine determines are read only or unmodified by adding any other layers. Each layer is in either a broken or unbroken state. Layers remain unbroken if an associated identifying signature and contents of layer remain unmodified by any other layer. The layers adhere to a policy requiring each compliant layer to be read only and/or not to modify any other layer when added to container image. The policy requires compliant layers to only modify their own contents when updated and to remain unbroken. The first and second layers are compliant when a third layer replaces the first layer. The layers remain compliant after replacement.

16 Claims, 5 Drawing Sheets

CONTAINER IMAGES BY COMPOSITION

BACKGROUND

The present disclosure generally relates to improving the construction of container images. In current embodiments, container images are immutable once created, being structured as a series of layers built on top of each other like floors in a building. Each layer may represent a component of a base operating system, middleware, or application. In many settings, a specific product may utilize dozens of layers to operate properly in a given environment. In different versions of the same product, for example, for use with different types of database and different database drivers and different operating systems, it may be necessary to build multiple, even dozens of container images with all of the associated overhead of accounting for the permutations and peculiarities of each release.

SUMMARY

The present disclosure provides a new and innovative system, methods and apparatus for creating container images by composition. In an example, the system includes a container image stored in a memory in communication with one or more processors. An image engine runs on the one or more processors. The container image includes a plurality of layers, which in turn includes at least a first layer and a second layer that is built on the first layer. The image engine determines that the first layer and the second layer are read only and/or remain unmodified by the addition of any other layer of the plurality of layers. Each layer of the container image is either in a broken state or an unbroken state. The image engine validates that each layer of the container image is associated with a respective identifying signature, which remain unmodified as long as the respective layers remain in the unbroken state. If any contents of a respective layer present at the time it was added to the container image are modified by an addition and/or an operation of any other layer of the container image, the respective layer is changed from the unbroken state to the broken state.

The image engine ensures that the plurality of layers adhere to a policy, which requires that each compliant layer be read only with respect to each other layer in the container image, and/or does not modify the contents of any other layer when it is added to the container image. The policy also requires that when any compliant layer is updated to a new version of the same layer, only the contents of the respective compliant layer being replaced are modified, and that each compliant layer remains in the unbroken state. The image engine determines that the first layer and the second layer are both compliant layers and replaces the first layer with a third layer, where the third layer is an updated version of the first layer. After the replacement the second layer and the third layer are both compliant layers, such that the plurality of layers, including the third layer, adheres to the policy.

Additional features and advantages of the disclosed method and apparatus are described in, and will be apparent from, the following Detailed Description and the Figures.

DETAILED DESCRIPTION OF EXAMPLE EMBODIMENTS

Figure 1:
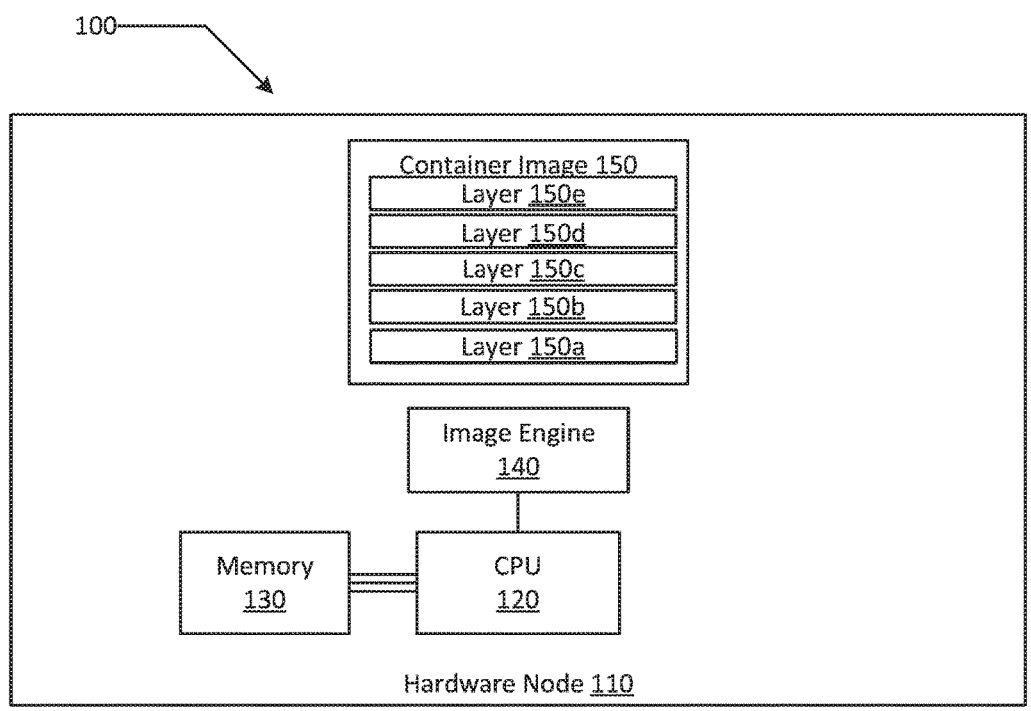
FIG. 1 is a block diagram of an example system illustrating a container image constructed by composition according to an example of the present disclosure.

In computer systems, containers are typically used for creating hosting environments for running application programs. A computer system may use a container based virtualization system such as Red Hat® OpenShift® or Docker®, and the containers may include all of the necessary components to generate an isolated runtime environment for specific applications including operating system, middleware, runtime and application components. To create fully functional environments without unnecessary overhead, containers images are typically constructed from individual layers, each of which includes a necessary component for the desired operation of the applications intended to run in the container, these layers combining together to form a container image for the desired purpose. A layer may be as large as a full operating system or as small as an individual configuration file, and it is not uncommon to need dozens of layers in a full image file. Each layer may provide a specific functionality necessary for the successful operation of the application in the container. These container image definitions are generally stored in the form of container images, available to be distributed to a wide array of host machines as required.

Generally, containers are launched from container images, and images are built from many layers where each container image may result from the combination of another container image and a layer. In a classic single inheritance model layers in container images are built on top of each other where each layer inherits an immutable parent-child relationship. A container with, for example, three layers, A, B and C, would be the parent of a container image with four layers, for example, A, B, C and D. In the example, container ABC would be the parent of container image ABCD, which would be defined by its relationship to container ABC as being a container that is layer D added to container image ABC. In order to update layer B to a new version B', while retaining the availability for use of container images ABC and ABCD, containers images AB, ABC and ABCD will need to be rebuilt in the form of container images AB', AB'C and AB'CD. While AB' and AB'C may be of no functional use as standalone container images, because of the direct inheritance model, in order to build AB'CD, AB' and AB'C are built first. With a few dozen layers in each container image, each of which may be required to be updated periodically, the resulting computational, buildout and storage requirements for creating containers image for an application quickly becomes an exponentially growing overhead. Take a simple example where an alternative container image ABED is required, the three rebuilds to replace layer B with B' becomes five since AB'E and AB'ED both need to be built in addition to AB', AB'C and AB'CD. A replacement of a layer at the head of a branch with 100 variants, that each may have dozens of layers, would require all 100 of those variants to be rebuilt resulting in the thousands of rebuilds for just one layer replacement. To verify that a container image is being built correctly, identifying signatures such as a hash for both a layer and its parent container image are generally computed and compared to defined values from when the container image was first created, and therefore any change to a container image's foundation will cause all derivative container images to recognize the change to their parents' hash and require a rebuild, even if the change was minor or inconsequential to the functioning of the child container image, since even a minor one bit change will cause a hash to change. This creates a large fan out problem.

The present disclosure aims to address the fan out problem faced by image engines and image repositories that build container images by leveraging a composition model for constructing container images. For example, the problem expressed above is alleviated by defining a container image not as a parent container image plus a top level layer, but rather as a series of layers that adhere to a policy requiring layers to be read only and/or not to modify any other layer when added to a container image, and also, to only modify their own contents when updated. Adherence to the policy allows layers to be modular and replaceable without extensive rebuilds of an exponential number of container images. In an example, replacing a layer B in container images ABCD and ABED with layer B' then becomes only a matter of rebuilding two container images, AB'CD and AWED rather than five. Methods and systems enabling this paradigm shift may be implemented as described in further detail below.

Beyond being an image proliferation issue, inheritance is generally considered a less optimal pattern in computer science. A simple real life analogy would be to consider how we build cars and engines. One would generally view that relationship as a car embeds an engine (or a car has an engine). This has the nice side effect of allowing one to replace the engine, or sell the car with multiple engine options, or even upgrade the engine after the fact. This is a composition model. An inheritance model for cars and engines would mean that a car is defined by its engine. You couldn't ever change the fact that a given car is always defined by the exact engine it inherits its engine characteristics from. Replacing the engine wouldn't be possible without either making a new car or replacing all engines in all cars of that type. This rigidly hierarchical structure generates overhead that generally cannot be avoided.

In a typical scenario, a middleware layer may include a runtime environment, with an additional layer to support, for example, the specific flavor of database that is intended to be used by the applications in a particular final container image. Dozens of database drivers are available depending on the desired type of database, but it may be undesirable to load multiple database drivers to a container image for storage and performance reasons, especially where some database driver versions tend to conflict with others. This results in multiple variants of a container image resulting from options being offered in only one or two layers. The operating system and application layers may also require different combinations of their own sub-packages to support varying databases, multiplying the number of variant container images. The application may also need to support a variety of different data inputs and database schemas based on the availability of data in each customized implementation of the container image. Support for different operating systems may also be necessary. A single deployment of an application may require dozens to hundreds of slightly differing container images to be built, all of which are substantially similar to each other, and also for all of these container images and dependent container images to be rebuilt for any updates.

In many situations, the necessity for interoperability especially in UNIX® and LINUX® environments requires compliance with the IEEE®'s POSIX® standards. Included among these standards are rules for the implementation of environment variables, directory structures and file names. If adding an upper layer rewrites anything in an existing lower layer, it may be impossible to change the lower layer again without simultaneously changing the upper layer, thereby creating a dependence on the inheritance structure. A particular layer cannot necessarily be assured of its sanctity and integrity once any other layer is built on top of it. Implementations allowing a unioning of a filesystem between layers such as OverlayFS have failed to gain industry traction in part due to a lack of POSIX® compliance. Particularly difficult hurdles to overcome in decoupling container image layers from an inheritance model include the reliance of industry standard application installation utilities such as yum (yellowdog updater modified) on shared metadata, a feature also present in Microsoft® operating system implementations utilizing the Windows® registry. These challenges may be especially problematic when faced with layers and packages that produce minor changes to large existing files and/or metadata in a container image, as the replacement version of these large files becomes integrated with the layer, resulting in larger layers requiring for example, more disc I/O, processor time and network bandwidth to assemble into a completed container image.

Generally, forcing composition models for filesystem usage by programs forces better design. Shared metadata like the Windows® registry and yum datastores are both major challenges for many users/developers of container images today. When one adds a package to a container image (e.g., through yum install), the overall size of the change may be dwarfed by the size of the update to the packaged metadata picked up when installing a new package to the container image. Forcing the metadata to be stored in a new file, enables enforcing that a layer updating the metadata would generally be much smaller since existing large files would not be modified and hence not copied into new layers. In addition, by not requiring container image rebuilding to make changes, only one build needs to be performed if a base image changes rather than rebuilding everything. Therefore, storage space and necessary performance are reduced since file storage won't be duplicated for files copied on write to upper layers. In some examples, storage may be optimized through deduplication because each composition compliant layer would be completely modular, and thus may be retrieved at build time through an identifier without needing to be stored as part of a complete container image for retrieval.

The present disclosure provides for novel methods and systems for constructing container images that do not rely on inheritance, while simultaneously overcoming significant adoption hurdles by providing application developers with sufficient latitude to implement applications as desired in containers. In an example, many of the benefits of a full composition model may be achieved in a hybrid model, where operating system and middleware layers which have the largest chance of causing extensive rebuilds of many container images when updated, could adhere to a composition model, where layers could be swapped with updated replacement versions of the same layers without a full rebuild of every dependent container image, while application layers could maintain the flexibility of an inheritance model and build upon other, pre-existing images. In such examples, a balance may be struck between agile development and ease of deployment. Advantageously, less actors are required to make changes, and less changes are required to be made, as the lower the level of the layer that is being changed to conform with a composition model, the greater the resulting savings from the usage of a composition model. For example, Red Hat® may adhere to a composition model for its Red Hat® Linux® operating system, and make updates to such operating system, without requiring any major changes from any of its customers, collaborators, or partners (or competitors) building components running on the operating system. In such an example, container images created by an image engine (e.g., Red Hat® OpenShift® or Docker® DockerHub®), using a composition version of Red Hat® Linux® can have the advantage of being able to perform operating system updates (e.g., security updates or driver updates), without needing to rebuild every container image in the image registry (e.g., Docker® Registry) that utilizes Red Hat® Linux®. The more blocks of layers that adhere to the composition model, the more flexibly the container image may be updated and deployed.

In some advantageous examples, a composition model may be implemented by setting the contents of each layer to a read only state with respect to all future layers added on top of each respective layer as each respective layer is added to the container image during construction. The composition model ensures that new layers do not change or overwrite any of the contents of a foundational layer, and that replacing a foundational layer does not overwrite any of the contents of a higher level layer. In situations where it may be impractical to enforce pure read-only status on layers, the read only designation may be removed when such a container is launched to run its applications, as doing so would not affect the base container image build used to launch any new instance of the container. Most applications may live with the files of other layers being read only, however, certain integral metadata components tend to be shared between applications, for example, yum metadata or Windows® registry information. Enforcement of a pure read only paradigm would require fundamental changes to how such shared metadata components function, for example, enforcing that each layer have its own separate metadata store for its own use rather than a shared system-wide metadata. Technologies for unioning filesystem layers together (e.g., OverlayFS or hardlinking) may then allow base layers to be rebuilt without touching upper layers. In an alternative example, each layer may be forbidden from interacting with the contents of other layers. Potential issues may arise when overwriting information from another layer is actually the preferred course of action, for example, modifying an underlying layer produced by another party to work around a security vulnerability.

In some examples, enforcement may occur by means of a filesystem and directory structure. In an example, the contents of each layer (e.g., files and folders) may be labeled to indicate the layer they belong to. In a further example, files written by each layer may be distinguishably labeled (even where file and directory names are shared), such that files of one layer never overwrite files of another layer. An example embodiment may require that each layer stay within a predefined confined space to ensure that the layers do not step on each others' toes. For example, two "file_001"s may exist, but one would be labeled for example as belonging to layer 1 and another to layer 7. In some examples, an attempt by one layer to modify the contents of another layer would automatically cause the creation of a substitute file reflecting the new changes without modifying the original file. In an example, when such a file is being accessed, certain rules may be defined to identify which version (e.g., the layer 1 or layer 7 version of "file_001" is accessed). In another example, the system or program accessing the file may specify which version is requested. In other examples, the attempt to modify or overwrite may trigger an error, terminating the container image build or requiring user intervention. An example of user intervention may include merging changes, for example, with a source control style merge system. A system may temporarily copy on write files being modified before committing the addition of a layer to an image file (e.g., using pid files, log files, or caches) to provide the opportunity for user feedback. Requirements for any layer replacing another layer could include features such as equivalency of Application Programming Interface (API) to ensure backwards compatibility, or a declaration, possibly via metadata, that specific functions are no longer backwards compatible. Shared metadata may be accounted for in a form similar to a separate table in a database or a separate worksheet in a spreadsheet for each layer of the container image.

In examples where an identifying signature such as a hash or checksum is used to uniquely identify layers and container images, a potential problem that presents itself is the loss of integrity between layers and container images when a layer is replaced. In models where a container image is defined as the hash of its parent associated with the hash of the top layer, changing any layer of the parent container image would change the hash of such parent, causing the final container image to no longer be able to associate the updated parent as its parent. In some examples, a look up system (e.g., a database, register or metadata) may be utilized such that whenever a layer is updated for a container image, new hash values may be calculated and automatically propagated to each derivative container image stemming from the updated container image. In other examples, rather than defining a container image as a hash of its parent and a hash of its final layer, the container image may be defined as an array of hashes, one entry for each layer it is composed of. In cases where this information is stored in metadata, upon the replacement of any layer with an updated version, a simple look up and replace of every instance of such layer's hash with its updated hash would update all derivative container images using such a layer, without any expensive calculations.

Thus, the presently disclosed image engine provides significant advantages over existing container image construction technology, including but not limited to: reduced storage space needs, reduced storage performance needs, reduced processing time, reduced heat generation, reduced power consumption, enhanced security (from ease of updates), faster release and deployment, enhanced diversity of product offerings, enhanced legacy support, and reduced maintenance overhead.

FIG. 1 depicts a block diagram of an example system 100 illustrating a container image constructed by composition according to an example of the present disclosure. In an example, hardware node 110 may host one or more physical processors (e.g., CPU 120) communicatively coupled to respective memory devices (e.g., memory 130). As discussed herein, a memory device 130 refers to a volatile or non-volatile memory device, such as RAM, ROM, EEPROM, or any other device capable of storing data. As used herein, physical processor or processor (120) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 120 may be interconnected using a variety of techniques, ranging from a point-to-point processor interconnect, to a system area network, such as an Ethernet-based network. In an example, image engine 140 may operate as a component of the hardware node 110 such as an executable program performing the functions of the image engine 140 in the present disclosure. For example, an executable program of the image engine 140 may be in a number of languages including ARM® architecture assembly, Atmel AVR assembly, x86 assembly, Freescale 68HC11 assembly, Freescale v4e assembly, Motorola 680x0 assembly, MIPS assembly, PowerPC® assembly, IBM® System z assembly, TI® MSP430 assembly, Zilog Z80 assembly, and machine code. Image engine 140 may run on processors 120. Local connections within the image engine 140 including, for example, the connections between processor 120 and memory 130 may be provided by one or more local buses of suitable architecture, for example, peripheral component interconnect (PCI). In an example, the image engine 140 may be a container orchestrator such as Kubernetes. In an example, hardware node 110 may be an image repository found in containerization products such as Docker® DockerHub®, Pivotal® Cloud Foundry, IBM® BlueMix®, Amazon® Amazon Web Services® (AWS®), Google® Google Cloud Platform™, or Microsoft® Azure®.

In an example, container image 150 is one of many possible container images constructed and stored within hardware node 110, in some examples, container image 150 may be stored within memory 130. Container image 150 may be composed of a multitude of layers, in an example, these may include layers 150a, 150b, 150c, 150d, and 150e. In an example, layers 150a and 150b may include operating system components of container image 150, layers 150c and 150d may include middleware and runtime components of container image 150, and layer 150e may include application components of container image 150. In other examples, container image 150 may include more layers not depicted. In an example, container image 150 may be stored as a container image file until it is requested.

Figure 2:
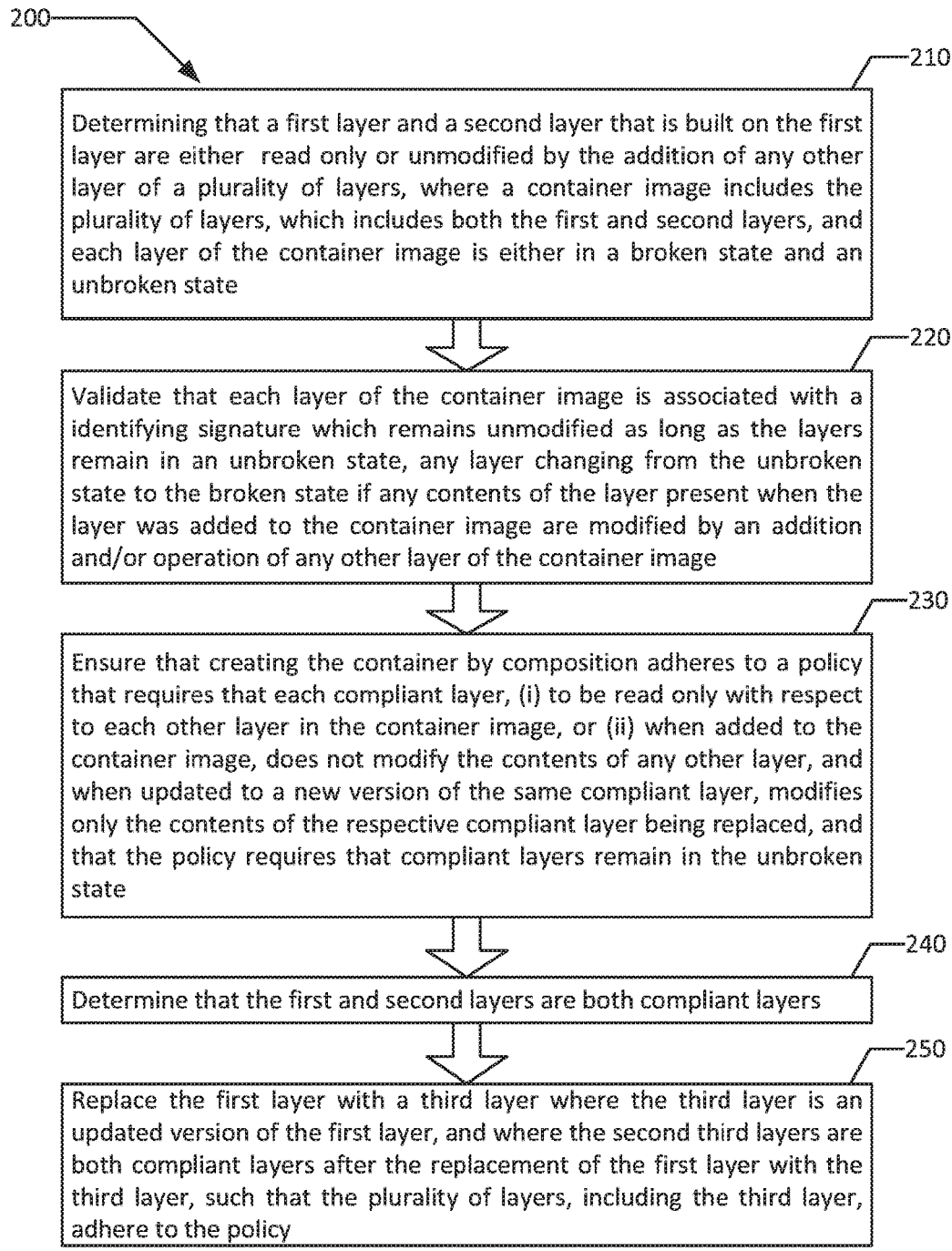
FIG. 2 is a flowchart illustrating an example container image constructed and updated by composition according to an example of the present disclosure.

FIG. 2 is a flowchart illustrating an example container image constructed and updated by composition according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by an image engine 140.

Figure 3:
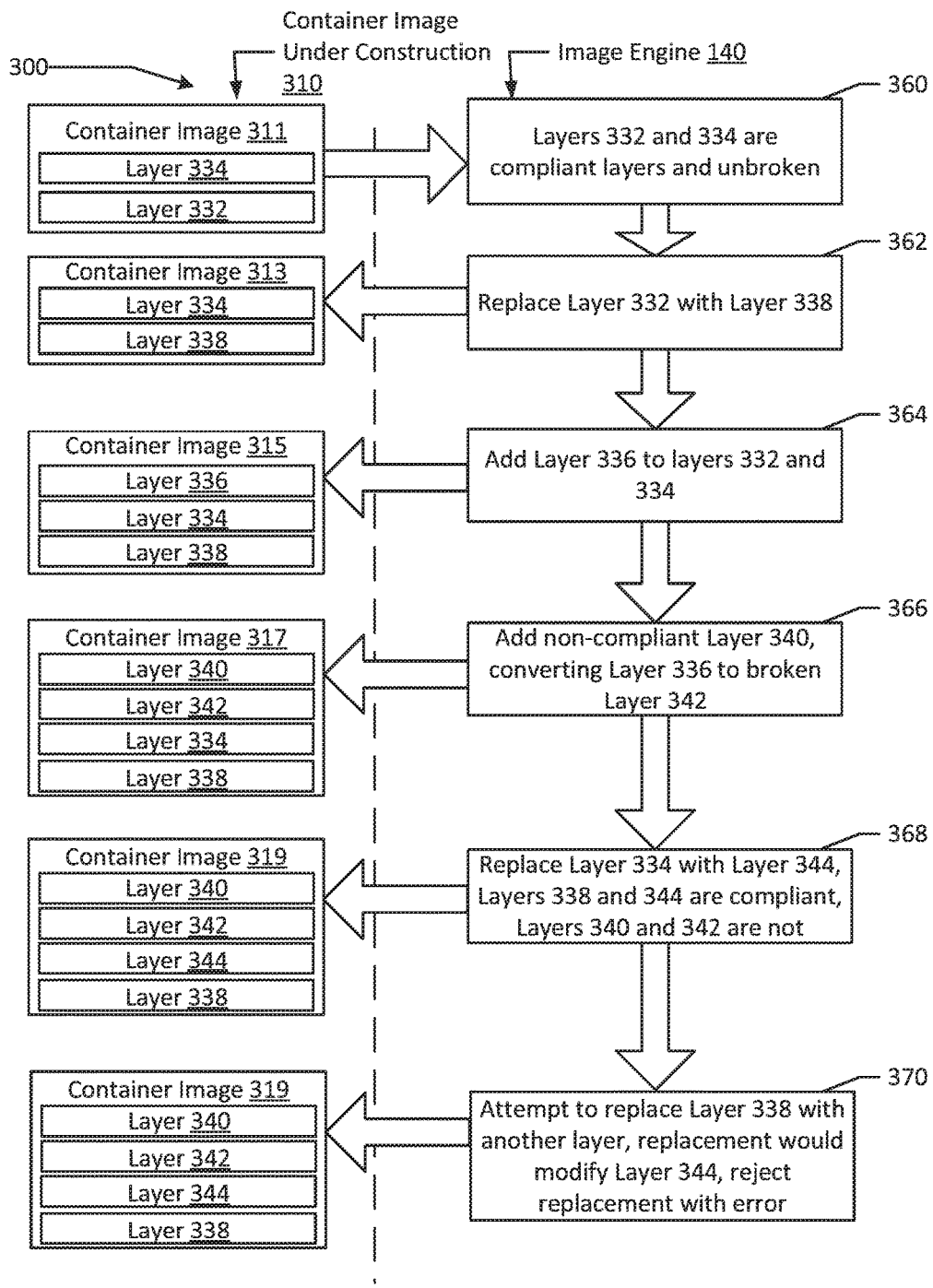
FIG. 3 is a flow diagram illustrating an example container image constructed and updated by composition according to an example of the present disclosure.

In an example where a container image includes the plurality of layers, which includes at least a first layer and a second layer, and each layer of the container image is in one of a broken state and an unbroken state, method 200 begins by determining that the first layer and the second layer that is built on top of the first layer are read only and/or unmodified by the addition of any other layer of a plurality of layers (block 210). FIG. 3 illustrates a flow diagram illustrating an example container image constructed and updated by composition according to an example system 300 of the present disclosure. Although the examples below are described with reference to the flowchart illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In an example of method 200 illustrated in system 300, container image 310 includes a plurality of layers (e.g., layers 332 and 334). Layers 332 and 334 may be verified by the image engine 140 to be either read only or unmodified or both. In an example, layer 332 may be a lower level layer than layer 334.

After determining that at least the first and second layers are read only and/or unmodified, in an example, it is further validated that each layer of the container image is associated with a respective identifying signature that remains unmodified as long as the respective layers remain in the unbroken state, where any layer is changed from the unbroken state to the broken state if any contents of the respective layer that were present when the layer was added to the container image are modified by the addition and/or an operation of any other layer of the container image (block 220). In an example, an identifying signature may be a hash, a checksum, or some other metadata signature. In an example, verifying that a layer's identifying signature has not changed may be indicative that its contents have not changed. For example, this determination may be performed by image engine 140 or by another program running on processor 120.

Along with validating that each layer has an associated identifying signature, it is ensured that the plurality of layers adheres to a policy that requires each compliant layer to be read only with respect to each other layer in the container image, and/or time when each respective compliant layer is added to the container image, the respective layer does not modify the contents of any other layer, the policy also requiring that the updating of any respective compliant layer with a new version of the same respective compliant layer modifies only the contents of the respective compliant layer being replaced, and that each compliant layer remains in the unbroken state (block 230). In an example, compliance with the policy may entail a segregated storage solution where attempts to overwrite or modify contents of other layers may result in a parallel copy of the content being created, for example, in a directory or file labeled with an identifier for the layer making the change. In an example, a system or container may determine which copy of the content to use in a specific situation or by a specific layer or application. In another example, a user may be prompted to rename or otherwise prevent the overwriting or modifying of the contents of one layer by another through user intervention.

In an example, the first layer and the second layer are both determined to be compliant layers (block 240). In the illustrated system 300, the image engine 140 verifies that layers 332 and 334 are a plurality of layers that are all compliant layers. For example, the image engine 140 determines that layers 332 and 334 are compliant with the policy and remain unbroken (block 360).

In an example, the first layer is replaced with a third layer, where the third layer is an updated version of the first layer, and the second layer and the third layer are both compliant layers after the replacement of the first layer with the third layer, such that the plurality of layers, including the third layer, adhere to the policy (block 250). In an example, the second layer may recognize that the third layer is a replacement of the first layer and replace references to the identifying signature of the first layer with the identifying signature of the third layer. For example, the image engine 140 replaces layer 332 in container image 313 with layer 338 to create container image 313 (block 362). All of the layers of container image 313 (e.g., layers 334 and 338) are part of the plurality of layers, compliant to the policy, and unbroken. In an example, a fourth layer may be added to the container image, for example, image engine 140 may add layer 336 to container image 313 to create container image 315, all of the layers of container image 315 (e.g., layers 334, 336 and 338) being compliant with the policy and unbroken (block 364). In another example, the system 300 may determine that the third layer (e.g., layer 338) or the fourth layer (e.g., layer 336) is non-compliant and stop the construction of the container image with a warning that construction has failed.

In an example, compliance with the policy may not be required of all layers, for example, upper level layers may be allowed to be non-compliant. In illustrated example 300, layers 338 and 334 may include operating system and middleware components that are compliant with the policy, while layer 336 may be an application running on the foundation of layers 338 and 334. In such an example, another layer, for example layer 340 may be added to container image 315, creating container image 317, where layer 340 is unbroken, but non-compliant with the policy. As a result, for example, layer 340 modifies layer 336 as it is added to the container image, transforming layer 336 into a layer 342, which is no longer compliant with the policy by becoming broken (block 366). In an example where adding a fifth layer (non-compliant) layer to a container image breaking a fourth layer rendering the fourth layer non-compliant, even though, functionality wise the container image may still perform as expected. However, it becomes likely that the fourth layer cannot be replaced without also replacing the fifth layer. In an example, a user may allow layer 336 to be modified by the addition of layer 340, thereby allowing layer 336 to no longer be compliant with the policy. In another example, the image engine 140 may be used to merge any changes layer 340 may attempt to make to layer 336 into layer 336 in order to allow layer 340 to be added to the container image while, for example, preserving the functionality of both layer 336 and layer 340. In the example, the image engine 140 may, for example, add additional identifiers to allow the container image to differentiate between the layer 336 and layer 340 versions of the same information, resolve conflicts based on a modification time of the different versions of the same information, or combine layers 336 and 340 into a combined new layer. In an example, layer 336 may be an application layer, and layer 340 may be a patch to change the behavior of the application, for example, adding support for a new database schema to application layer 336.

In a further example, a sixth layer may replace the second layer, where the sixth layer is an updated version of the second layer, after the replacement, the third layer remains compliant, the sixth layer being compliant, and the fifth layer remains unbroken. In illustrated example 300, the image engine 140 may cause layer 344 to replace layer 334 from container image 317, resulting in container image 319 including layers 338, 344, 342, and 340, where layers 338 and 344 are compliant, layers 340 and 342 are non-compliant, but layer 342 remains unbroken (block 368). In an example, an attempt may be made by image engine 140 to replace layer 338 with another layer, but image engine 140 may determine that the resulting replacement would attempt to modify layer 344, and thereby the image engine 140 may reject the attempted replacement (block 370). In an example, the image engine 140 may determine that the replacement of layer 338 may irreparably damage the functionality of layer 344 and therefore reject the replacement of layer 338 with an error. In another example, the image engine 140 may instead warn the user of the changes that the replacement of layer 338 are attempting to make, allowing the user to either accept or reject those changes to layer 344. In an example, the image engine 140 may determine that it would be possible for the replacement of layer 338 and layer 344 to coexist through, for example, adding additional identifiers to allow the container image to differentiate between the layer 338 and layer 344 versions of the same information, resolve conflicts based on a modification time of the different versions of the same information, or combine layers 338 and 344 into a combined new layer. In an example, accepting the changes could result in a parallel copy of the changed contents of layer 344 to be made, both copies of the contents remaining accessible. In an example, each layer may have a respective location designated for the storage of its contents in the memory 130. In another example, each layer may have an identifier affixed to its contents such that without intervention, one layer cannot write any changes to the memory 130 that would overwrite the contents of any other layer. In some examples, image engine 140 may also track layers or groups of layers that are partially compliant with the policy, for example, layers 340 and 342, which only modified each other, may be replaced together without requiring any additional rebuilding of container images, but layer 342 may not be able to be replaced independently since it was modified by layer 340.

Figure 4:
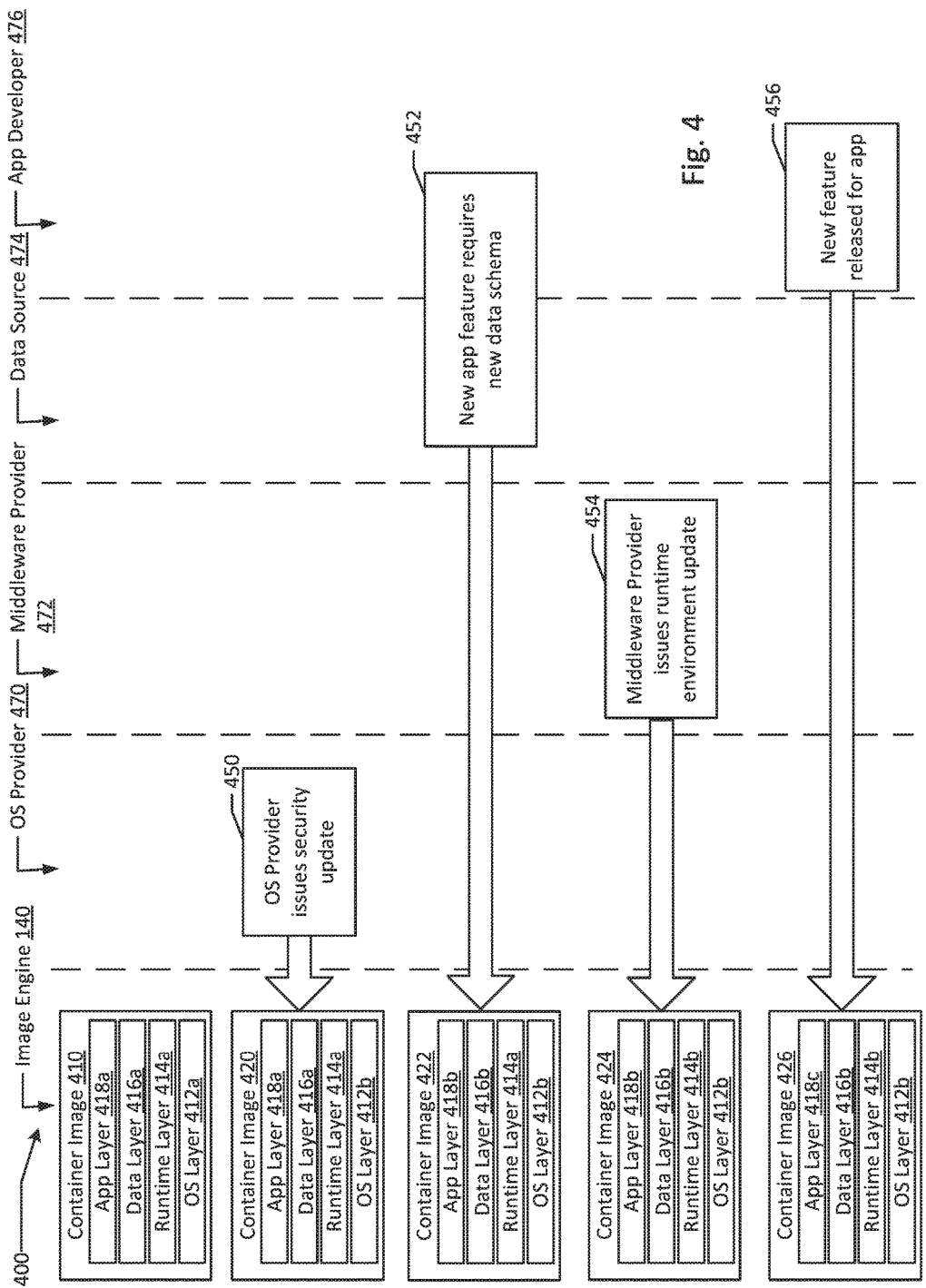
FIG. 4 is a flow diagram illustrating example triggers to update a container image constructed by composition according to an example of the present disclosure.

FIG. 4 is a flow diagram illustrating example triggers to update a container image constructed by composition according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In system 400, a compliantly functioning container image 410 is updated by image engine 140 due to requirements posted by many different actors, container image 410 including an operating system layer 412a, a runtime layer 414a, a data layer 416a, and an application layer 418a. In an example, operating system layer 412a may include an operating system (e.g, Red Hat® Linux®, Microsoft® Windows®, etc.), runtime layer 414a may include middleware components (e.g., Java® Runtime Environment, .NET Framework®, PERL®, etc.), data layer 416a may include a database or filesystem, and application layer 418a may include an application that container image 410 was built to run.

In an example, the provider of the operating system 470 may issue a security update for the operating system running in operating system layer 412a (block 450). Image engine 140 may determine that the update may be packaged in a new, updated version of operating system layer 412a, for example operating system layer 412b, and thereby replace operating system layer 412a with operating system layer 412b in container image 410, resulting in container image 420. In an example, the next time a new container is requested to host the application in application layer 418a, container image 420 may be delivered by the image engine 140 rather than container image 410. In an example, replacing layer 412a in container image 410 may be performed by switching metadata references to layer 412a in container image 410 to metadata references for layer 412b without constructing physical copies of either container image 410 or container image 420. In an example, container image 410 may be stored as a container image file. In a further example, a container image file may store the contents of a container image in any reconcilable way, for example, a container image file may contain the full contents of each layer that is included in the container image, or the container image file may include references, including metadata references pointing to where each layer of the container image may be retrieved for assembly.

Subsequently, the application developer 476 may create a new version of the application that requires a different data schema, and therefore update data source 474. The application developer 476 may indicate to the image engine 140 that the application layer 418a and the data layer 416a are required to be updated in container image 420 to reflect the new application (block 452). As a result, the image engine 140 may determine that the proposed updates would not remove compliance with the policy. Alternatively, the image engine 140 may determine that the proposed updates would remove compliance with the policy, however, image engine 140 may determine that because all of the top layers are being replaced together, compliance with the policy does not matter in this instance and layers 416a and 418a are replaced in container image 420 with layers 416b and 416b, resulting in container image 422 with layers 412b, 414a, 416b and 418b.

In an example, the middleware provider 472 may then issue an update to the runtime environment (block 454). The image engine 140 may determine that the updated runtime environment may be packaged as a runtime layer 414b, and then the image engine 140 may push the updated runtime layer 414b to all container images that utilized runtime layer 414a. In an example, the image engine 140 may replace all metadata references to runtime layer 414a in container images and layers managed by image engine 140 with references to runtime layer 414b, including references to the location of the layers in memory 130 and the identifying signatures associated with the layers. In the example, the next time any container image utilizing layer 414a is launched, it would use the updated layer 414b instead. In an example, a particular container image may opt out of receiving automated updates to its layers. In the illustrated example 400, image engine 140 replaces runtime layer 414a in container image 422, resulting in container image 424 including layers 412b, 414b, 416b, and 418b.

The application developer 476 may then release a new feature for the application in layer 418b (block 456). As the application layer is the top layer, the image engine 140 may or may not check whether the updated layer 418c is compliant with the policy. As a result of replacing layer 418b with layer 418c, the application developer 476 has successfully deployed the application by creating container image 426 with layers 412b, 414b, 416b, and 418c.

Figure 5:
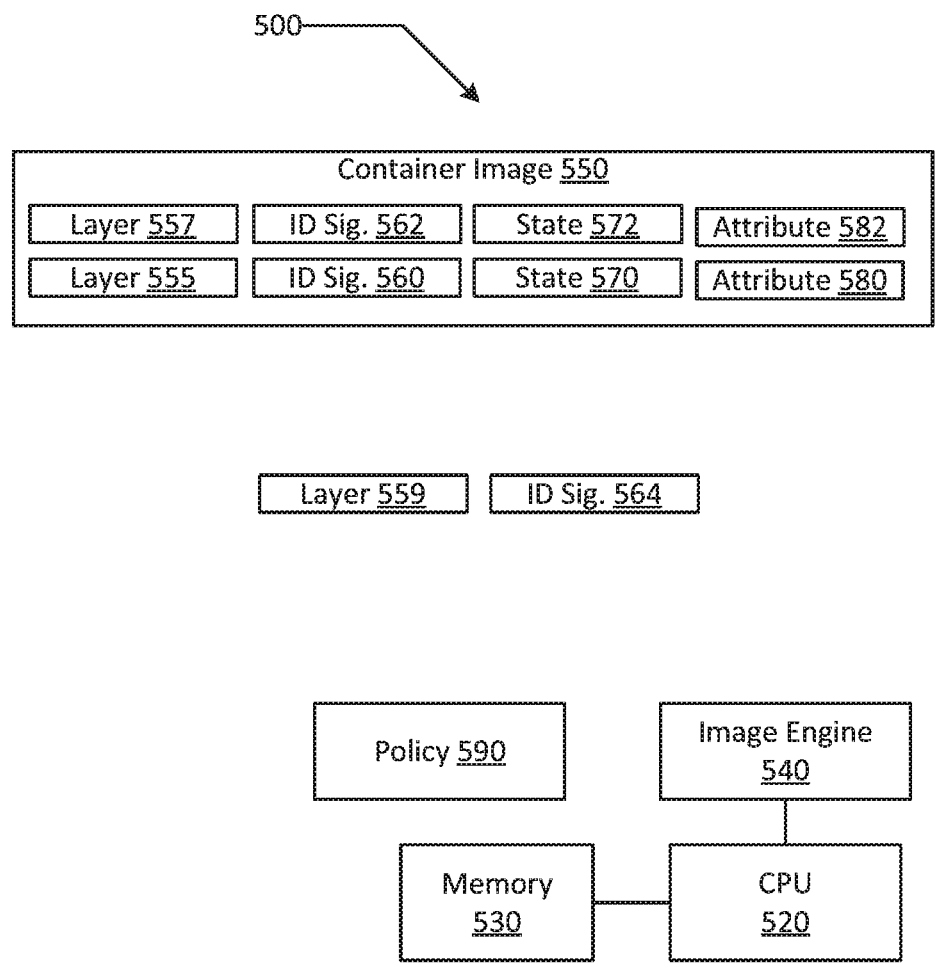
FIG. 5 is a block diagram of an example container image construction by composition system according to an example of the present disclosure.

FIG. 5 is a block diagram of an example container image construction by composition system of the core components of an example of the present disclosure. Example system 500 includes a memory 530 in communication with one or more processors 520, with an image engine 540 executing on the one or more processors, and a container image 550 stored in the memory 530. In an example, container image 550 includes a plurality of layers including a first layer 555 and a second layer 557, and the image engine 540 determines that the first layer 555 and the second layer 557 are read only, and/or have remained unmodified by the addition of any other layer of the plurality of layers (e.g., layers 555 and 557). In an example, each layer (e.g., layers 555 and 557) of the container image 550 is in either a broken state (e.g., 570 and 572) or an unbroken state (e.g., 570 and 572).

The image engine 540 validates that each layer (e.g., 555 and 557) of the container image 550 is associated with a respective identifying signature (e.g., identifying signatures 560 and 562). In an example, identifying signatures 560 and 562 may be hashes, checksums or some other unique identifier such as metadata. In example 500, the identifying signatures 560 and 562 remain unmodified as long as layers 555 and 557 remain in the unbroken state (e.g., states 570 and 572). In an example, a layer (e.g., 555 or 557) may change from the unbroken state (e.g., 570 and 572) to the broken state (e.g., 570 and 572) if any contents of the layer (e.g., 555 or 557) present when the layer was added to the container image 550 are modified by an addition and/or an operation of any other layer of the container image 550.

The image engine 540 ensures that the plurality of layers (e.g., 555 and 557) adhere to a policy 590, that requires each compliant layer (e.g., 555 and 557) include at least one attribute (e.g., 580 or 582). The attribute may be that the compliant layer (e.g., 555 or 557) is read only with respect to each other layer in the container image 550, and/or that when the compliant layer (e.g., 555 or 557) is added to the container image 550, the respective layer (e.g., 555 or 557) does not modify the contents of any other layer. In an example, the policy 590 also requires that the updating of any compliant layer (e.g., 555 or 557) with a new version of the same compliant layer (e.g., 559) modifies only the contents of the compliant layer (e.g., 555 or 557) being replaced, and that each compliant layer (e.g., 555 or 557) remains in the unbroken state (e.g., 570 and 572).

In an example, the image engine 540 determines that the first layer 555 and the second layer 557 are both compliant layers (e.g., 555 and 557) and replaces the first layer 555 with a third layer 559. In an example the third layer 559 is an updated version of the first layer 555 and the third layer 559 is associated with an identifying signature 564. After replacement of the first layer 555 with the third layer 559 in container image 550, the second layer 557 and the third layer 559 are both compliant layers (e.g., 557 and 559). In an example, after the addition of the third layer 559 to the container image 550, the third layer becomes part of the plurality of layers now composed of layers 557 and 559, the plurality of layers (e.g., 557 and 559) adhering to the policy 590.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of creating containers by composition, the system comprising:
   a memory including a container image;
   one or more processors, in communication with the memory; and
   an image engine, executing on the one or more processors, wherein the containers include components to generate an isolated runtime environment for specific applications,
   wherein the container image includes a plurality of layers, the plurality of layers including at least a first layer and a second layer that is built on the first layer, the image engine determines that the first layer and the second layer are at least one of read only and remain unmodified by the addition of any other layer of the plurality of layers, and each layer of the container image is in one of a broken state and an unbroken state,
   wherein the image engine validates that each layer of the container image is associated with a respective identifying signature, the identifying signatures remain unmodified as long as the respective layers remain in the unbroken state, and any respective layer changing from the unbroken state to the broken state if any contents of the respective layer present at a time such respective layer was added to the container image are modified by at least one of an addition and an operation of any other layer of the container image,
   wherein the image engine ensures that the plurality of layers adhere to a policy, the policy requiring that each compliant layer includes at least one attribute of (i) each respective compliant layer is read only with respect to each other layer in the container image, and (ii) at a time when each respective compliant layer is added to the container image, the respective layer does not modify the contents of any other layer, the policy also requiring that the updating of any respective compliant layer with a new version of the same respective compliant layer modifies only the contents of the respective compliant layer being replaced, and that each compliant layer remains in the unbroken state,
   wherein each layer is designated a different respective location in the memory for the storage of data necessary for each respective layer, and each compliant layer is restricted from writing to a location designated for any other layer, and
   wherein the image engine determines that the first layer and the second layer are both compliant layers and replaces the first layer with a third layer, wherein the third layer is an updated version of the first layer, and the second layer and the third layer are both compliant layers after the replacement of the first layer with the third layer, such that the plurality of layers, including the third layer, adhere to the policy.

2. The system of claim 1, wherein the image engine adds a fourth layer to the container image.

3. The system of claim 2, wherein the image engine determines that at least one of the third layer and the fourth layer is a non-compliant layer, stops constructing the container image and sends a warning that constructing the container image failed.

4. The system of claim 2, wherein the image engine:
   adds a fifth layer to the container image, wherein the fifth layer is a non-compliant layer and adding the fifth layer causes the fourth layer to become non-compliant, the fifth layer being in the unbroken state.

5. The system of claim 4, wherein the image engine:
   replaces the second layer with a sixth layer, wherein the sixth layer is an updated version of the second layer, the third layer remains compliant, and the fifth layer remains in the unbroken state after the replacement of the second layer with the sixth layer, the sixth layer being compliant.

6. The system of claim 4, wherein the image engine:
   copies any portions of the fourth layer that will be modified by the addition of the fifth layer, and provides at least one of a user and the image engine with the option to one of (i) allow the modifications to occur and (ii) reject the modifications.

7. The system of claim 1, wherein each identifying signature is one of a checksum and a hash.

8. A method of creating containers by composition, the method comprising:
   determining that a first layer and a second layer that is built on the first layer are at least one of read only and unmodified by the addition of any other layer of a plurality of layers, wherein a container image includes the plurality of layers, the plurality of layers includes at least the first layer and the second layer, and each layer of the container image is in one of a broken state and an unbroken state, and wherein the containers include components to generate an isolated runtime environment for specific applications;
   validating that each layer of the container image is associated with a respective identifying signature, wherein the identifying signatures remain unmodified as long as the respective layers remain in the unbroken state, and any respective layer changing from the unbroken state to the broken state if any contents of the respective layer present at a time such respective layer was added to the container image are modified by at least one of an addition and an operation of any other layer of the container image;
   ensuring that the plurality of layers adheres to a policy, the policy requiring that each compliant layer includes at least one attribute of (i) each respective compliant layer is read only with respect to each other layer in the container image, and (ii) at a time when each respective compliant layer is added to the container image, the respective layer does not modify the contents of any other layer, the policy also requiring that the updating of any respective compliant layer with a new version of the same respective compliant layer modifies only the contents of the respective compliant layer being replaced, and that each compliant layer remains in the unbroken state, wherein each layer is designated a different respective location in a memory for the storage of data necessary for each respective layer, and each compliant layer is restricted from writing to a location designated for any other layer;

determining that the first layer and the second layer are both compliant layers; and replacing the first layer with a third layer, wherein the third layer is an updated version of the first layer, and the second layer and the third layer are both compliant layers after the replacement of the first layer with the third layer, such that the plurality of layers, including the third layer, adhere to the policy.

9. The method of claim 8, further comprising:

adding a fourth layer to the container image.

10. The method of claim 9, further comprising:

determining that at least one of the third layer and the fourth layer is a non-compliant layer; and stopping construction of the container image and sends a warning that constructing the container image failed.

11. The method of claim 9, further comprising:

adding a fifth layer to the container image, wherein the fifth layer is a non-compliant layer and adding the fifth layer causes the fourth layer to become non-compliant, the fifth layer being in the unbroken state.

12. The method of claim 11, further comprising:

replacing the second layer with a sixth layer, wherein the sixth layer is an updated version of the second layer, the third layer remaining compliant, and the fifth layer remaining in the unbroken state after the replacement of the second layer with the sixth layer, the sixth layer being compliant.

13. The method of claim 11, further comprising:

copying any portions of the fourth layer that will be modified by the addition of the fifth layer, and providing at least one of a user and the image engine with the option to one of (i) allow the modifications to occur and (ii) reject the modifications.

14. The method of claim 8, wherein each identifying signature is one of a checksum and a hash.

15. A computer-readable non-transitory storage medium storing executable instructions, which when executed by a computer system, cause the computer system to:

determine, that a first layer and a second layer that is built on the first layer are at least one of read only and unmodified by the addition of any other layer of a plurality of layers, wherein a container image includes the plurality of layers, the plurality of layers includes at least the first layer and the second layer, and each layer of the container image is in one of a broken state and an unbroken state, and wherein the containers include components to generate an isolated runtime environment for specific applications;

validate, that each layer of the container image is associated with a respective identifying signature, wherein the identifying signatures remain unmodified as long as the respective layers remain in the unbroken state, and any respective layer changing from the unbroken state to the broken state if any contents of the respective layer present at a time such respective layer was added to the container image are modified by at least one of an addition and an operation of any other layer of the container image;

ensure, that the plurality of layers adheres to a policy, the policy requiring that each compliant layer includes at least one attribute of (i) each respective compliant layer is read only with respect to each other layer in the container image, and (ii) at a time when each respective compliant layer is added to the container image, the respective layer does not modify the contents of any other layer, the policy also requiring that the updating of any respective compliant layer with a new version of the same respective compliant layer modifies only the contents of the respective compliant layer being replaced, and that each compliant layer remains in the unbroken state, wherein each layer is designated a different respective location in the memory for the storage of data necessary for each respective layer, and each compliant layer is restricted from writing to a location designated for any other layer;

determine, that the first layer and the second layer are both compliant layers; and replace, the first layer with a third layer, wherein the third layer is an updated version of the first layer, and the second layer and the third layer are both compliant layers after the replacement of the first layer with the third layer, such that the plurality of layers, including the third layer, adhere to the policy.

16. The computer-readable non-transitory storage medium of claim 15, wherein the computer system further adds a fourth layer to the container image, determines that at least one of the third layer and the fourth layer is a non-compliant layer, and stops construction of the container image and sends a warning that constructing the container image failed.

* * * * *